United States Patent [19]
Turner

[11] 3,873,508
[45] Mar. 25, 1975

[54] PREPARATION OF ACRYLONITRILE POLYMER

[75] Inventor: John J. Turner, Wilmington, Del.

[73] Assignee: E. I. du Pont de Nemours and Company, Wilmington, Del.

[22] Filed: Dec. 27, 1973

[21] Appl. No.: 428,809

[52] U.S. Cl.............260/88.7 R, 260/29.6 AN, 260/32.6 N, 260/63 N, 260/79.3 M, 260/85.5 R
[51] Int. Cl....... C08f 3/76, C08f 15/02, C08f 15/22
[58] Field of Search...... 260/85.5 R, 85.5 P, 88.7 R, 260/88.7 G

[56] References Cited
UNITED STATES PATENTS
3,499,879  3/1970  Kobayashi et al............. 260/88.7 R
3,697,492  10/1972  Champ et al................... 260/88.7 R

*Primary Examiner*—Harry Wong, Jr.

[57] ABSTRACT

Preparation of acrylonitrile polymers by polymerizing monomer in an aqueous medium at 120° to 215°C. produces a polymer-hydrate melt which separates at the bottom of a reactor. A continuous coupled process for polymerization and extrusion into fibers is disclosed.

5 Claims, 1 Drawing Figure

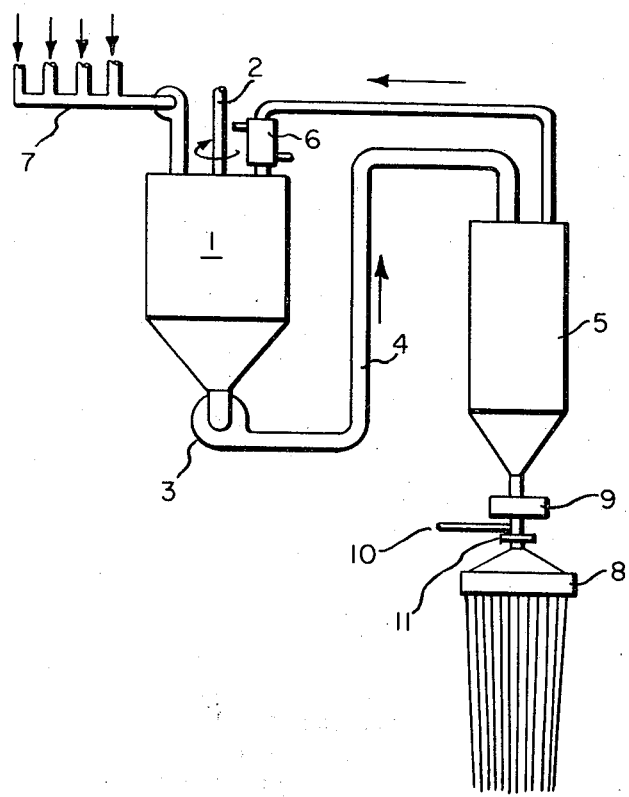

PREPARATION OF ACRYLONITRILE POLYMER

BACKGROUND OF THE INVENTION

This invention relates to preparation of acrylonitrile polymers, and is more particularly concerned with an improved polymerization process suitable for use in a coupled, continuous polymerization and extrusion process for producing fibers and films.

Acrylonitrile polymers have been prepared from monomer, comprising at least 40 weight percent of acrylonitrile, by polymerizing the monomer in an aqueous medium at 25° to 80°C. in the presence of a polymerization initiator. The polymer product precipitates as solid particles, forming an aqueous slurry. Recovery of the polymer has involved filtration, washing the filter cake to remove unreacted monomer and catalyst, and drying the polymer. Spinning solutions have been prepared by dissolving the polymer in a solvent such as dimethylformamide. Champ U.S. Pat. No. 3,669,919 discloses that drying of the polymer can be avoided by adjusting the water content to within the range of 1 to 40 percent by weight of the polymer and adding acetonitrile to form a mixture containing about 20 to 70 weight percent of polymer. This mixture forms a solution when heated to about 100° to 150°C. under at least autogeneous pressure and can then be extruded into shaped articles. Although this is a somewhat simpler process, the polymer must still be recovered by filtering an aqueous slurry and an organic solvent is required.

Goodman et al. U.S. Pat. No. 3,060,157 discloses a continuous process in which the polymerization is carried out at a temperature between 35° and 80°C., using a polymerization initiator, in a reactor supplied with components comprising 4 to 20 percent water, 17.5 to 70 percent organic solvent, and 24.5 to 75 percent monomer to provide a total of 100 percent of these components in the reactor feed. A polymer slurry is removed continuously from the reactor and passed through a stripper column to remove unreacted monomer and most of the water; the ratio of organic solvent to acrylonitrile polymer is also adjusted to give a product suitable for direct use in casting films or wet-spinning into acrylic fiber. The process avoids the previous steps of filtration, washing, drying, and solution preparation, but an organic solvent such as dimethylformamide is required.

SUMMARY OF THE INVENTION

The present invention is an improvement in the preparation of acrylonitrile polymer, by aqueous phase polymerization of monomer, for extrusion into fibers and films. The invention provides a continuous process suitable for use in a coupled polymerization and extrusion process, which does not require the use of an organic solvent in the polymerization medium. In accordance with this invention, the polymerization is conducted in a reaction medium consisting essentially of water, free-radical polymerization initiator, monomer and acrylonitrile polymer-hydrate in a pressure reactor maintained at a temperature within the range of about 120° to about 215°C. under at least autogenous pressure. Water, polymerization initiator, and monomer are continuously fed into the reactor at rates which provide a monomer/water ratio within the range of about 0.25 to about 4, and about 0.01 to about 1.0 percent of initiator based on the weight of monomer present. Polymer-hydrate separates as a melt phase at the bottom of the reactor, and is continuously removed and passed through a vessel where free-phase water (excess over that required to form polymerhydrate) and any unconverted, volatile monomer are removed from the melt. The product is suitable for extrusion directly into a zone characterized by lower temperature and pressure than in the reactor to form fibers or films.

If desired, while still under at least autogenous pressure, the polymer-hydrate melt removed from the reactor is separated from any entrained aqueous or volatile materials, and, optionally, from 0.5 to 10 percent, based on dry polymer content, of a compatible solvent for the polymer is added prior to the extrusion into a zone of lower temperature and pressure to obtain filaments or films. Or, if desired, while still under at least autogenous pressure, the polymerhydrate melt is mixed with a controlled amount of water and extruded into a zone of lower temperature and pressure to obtain foamed strands or plexifilamentary strands.

DESCRIPTION OF DRAWING

The drawing is a schematic representation of one form of apparatus which can be employed in the practice of the process of this invention. The polymerization reactor 1 is temperature controlled, heating and/or cooling being supplied by jacket means not shown. Agitator shaft 2 connects with an agitator inside reactor 1 and can be rotated, by means not shown, at a speed high enough to attain a uniform mixture of reagents in the reactor yet low enough to permit the somewhat denser polymer-hydrate-melt to settle into the conical reactor bottom from which it is moved by pump 3 through temperature-controlled line 4 into separator 5, also temperature controlled. Any free phase of water delivered into separator 5 is vaporized in the separator, along with any unconverted, volatile monomers, and recycled to the reactor through cooling condenser 6. Monomers, water and polymerization initiator are metered into manifold 7 from which they are pumped into reactor 1. Molten polymer hydrate with substantially no free-phase water in it is metered from separator 5 by pump 9. Additives, such as a controlled amount of free-phase water or a compatible solvent for the polymer, if desired, may be injected into the metered stream of polymer hydrate at 10 and mixed in by in-line mixer 11 before extrusion through spinneret 8.

DESCRIPTION OF THE INVENTION

The term "acrylonitrile polymers" as used herein is defined as those polymers which contain at least 40 weight-percent acrylonitrile; i.e., those in which units of acrylonitrile make up at least 40 percent of the polymers by weight. Thus, the term includes acrylic polymers and modacrylic polymers. The terms "acrylic polymer" or "acrylic filament" as used herein is defined as meaning those polymers containing at least 85 percent by weight units derived from acrylonitrile and filaments derived therefrom. Such polymers include the homopolymer of acrylonitrile (i.e., polyacrylonitrile) and copolymers of acrylonitrile with one or more suitable monomers copolymerizable with acrylonitrile. Suitable comonomers for the acrylonitrile polymers include addition-polymerizable compounds containing an ethylenically unsaturated moiety such as the acrylate or methacrylate esters including methyl acrylate, methyl methacrylate, and esters with residues of other alcohols including those having halogen substituents, vinyl acetate, styrene, acrylamide, methacrylamide, methacrylonitrile, vinyl chloride, halogenated styrenes, methyl vinyl ketone, vinyl pyrrolidone, the vinyl pyridines such as 2-methyl-5-vinyl pyridine, ethylene, sulfonic acids such as styrenesulfonic acid, vinylsulfonic acid, allylsulfonic acid, methallylsulfonic acid, and the amine, alkali-metal or alkaline earth-metal salts of such sulfonic acids. Preferred such copolymerizable monomers include methyl acrylate, vinyl acetate, styrene or a mixture of two or three of them, together with styrenesulfonic acid or its alkali metal, such as sodium salts. The preferred modification is dependent on properties desired in the shaped structure and characteristics, including structure, of the comonomer selected. Inherent viscosities of the acrylonitrile polymers usually range between 0.4 and 2.0 as measured at 30°C. in a solution of 0.5 gm. polymer in 100 cc. of dimethylformamide. Preferably, the inherent viscosity will be in the range of 0.7 to 1.1.

Several types of useful acrylonitrile-polymer products may be prepared by the process of this invention, depending on (1) whether an excess of water is present in the hydrate melt as extruded, (2) the temperature and viscosity of the melt as extruded and (3) the temperature and pressure of the environment into which the melt is extruded.

In general, shaping of the hydrate with from 0–7 percent more water, based on weight of dry polymer in the melt, than that present in the hydrate melt after removal of excess water (and volatile monomers), will lead to textile-type fibers and useful films if extruded at temperatures in the range of 155°–180°C., or up to about 15° lower temperature with up to about 10 percent of a compatible solvent for the polymer. A somewhat higher amount (up to about 15 percent) excess water or a higher temperature (to about 200°C.) in the melt as shaped leads to foamy extrudates. Still higher amounts of excess water (up to about 300 percent) and still higher temperature of the hydrate as shaped leads to plexifilamentary structures which exhibit unique water wettability and a soft, compliant tactility. Also, factors which affect viscosity of the hydrate melt (e.g., inherent viscosity of the polymer and presence or absence of a polymer solvent) exert an influence on the morphology of the extrudate at the instant of shaping which can alter significantly the nature of the shaped product. Dependent on the type product desired, the hydrate composition to be shaped may contain from about 20 to about 300 percent water based on polymer.

The initiator may be selected from the thermally generated free radical types such as benzoyl peroxide, cobalt (III) acetylacetonate, t-butyl peroxy trimethyl silane, t-amyl hydroperoxide, t-butyl peroxide, t-butyl hydroperoxide, t-butyl peracetate, dicumyl peroxide, azo bis (cyclohexanecarbonitrile), etc. The amount employed may range from about 0.01 to about 1.0 percent, based on monomers in the feeds, as required to produce the desired polymer inherent viscosity. A chain-transfer agent may also be employed, such as an alkyl mercaptan, or other organic compounds with an active hydrogen, as known in the art. Such chain-transfer, or "modifier" compounds assist in control of polymer molecular weight and alter the end-group chemistry of the polymer.

The useful polymerization temperature range is 120°–215°C., preferably 135°–155°C., due to excess monomeric acrylonitrile being present, and the rate of feeds is selected to give an average reactor working-volume hold-up time of 10–90 minutes. Essentially complete removal of any excess (free-phase) water (along with any unpolymerized acrylonitrile) by appreciably increasing the temperature to result in a melt temperature within the range of about 155°–215°C., in the hydrate preparation step is preferable even if water is subsequently to be added for the shaping of foams or plexifilamentary products, since addition of a calculated amount of excess water is more amenable to control than is elimination of volatile materials to a definite level of excess.

Preferably, the zone into which the hydrate is extruded will be maintained at a pressure in the range of 1–3.5 kg./cm.$^2$ and a temperature in the range of 40°–60°C. by addition thereto of air at approximately room temperature.

A "compatible solvent for the polymer" is defined as a solvent, which may comprise one or more compounds, and which meets the following criteria: (1) it must be capable of forming a dilutable solution containing about 10percent by weight of polymer at some temperature below about 180°C.; (2) the resulting solution must have a homogeneous appearance to the unaided eye; and (3) no component of the solvent may undergo substantial chemical reaction with other components of the solvent, the polymer, the polymer hydrate or free water at a temperature of 180°C. for a period of at least 1, preferably 30, minutes. It is satisfactory for a solvent to meet these criteria only under conditions of augmented pressure. Surprisingly, the boiling point of the solvent is of little or no consequence; if a solvent meets the above criteria of solvent power and chemical stability in the hydrate system, even one which boils below 100°C. is satisfactory for use in the process of this invention.

Use of a small amount of compatible polymer solvent offers several advantages in the practice of this invention. It significantly reduces the viscosity of the hydrate melt, thus facilitating higher extrusion speeds and improved spun-yarn quality by reducing the frequency of broken filaments; it also leads to improve transverse tensile properties in the drawn filaments prepared by this process. The true solvent is so tenaciously held by the filaments that even those which are low-boiling remain with the fiber to a substantial extent until the fiber is scoured.

"Compatible solvents for the polymer" include 2-pyrrolidone, ethylene carbonate, propylene carbonate, propiolactone, γ-butyrolactone, δ-valerolactone, γ-valerolactone, dimethylformamide, dimethylacetamide, N-acetyl morpholine, methyl ethyl sulfone, tetramethylene sulfone, tetramethylene sulfoxide, methyl ethyl sulfoxide, dimethyl sulfone, dimethyl sulfoxide, acetonitrile, sodium thiocyanate (in water), and generally any known solvent for acrylonitrile polymers which meets the above-described criteria. Preferred solvents are 2-pyrrolidone, ethylene carbonate and tetramethylene sulfone, based primarily on the important sub-criterion of low toxicity. A solvent which has a marginal instability is useful in the practice of this invention through the expedient of late-injection of the solvent into the preformed melt, as described above with reference to the figure, so that minimal exposure to the high temperature process is entailed. Those with superior stability are more versatile; e.g., tetramethylene sulfone may be incorporated with the monomer feed, or with the water feed, or may be injected as a separate stream into the separator with no undesirable side effects. Under these conditions, ethylene carbonate undergoes slight hydrolysis in the process, and the by-product carbon dioxide leads to bubbles in the extruded structure which are undesirable in textile filament or films but may be of no consequence in the product of plexifilamentary structures. It is preferred, therefore, when using ethylene carbonate or a solvent of similar marginal stability in the preparation of textile fiber to inject it at a late stage in the process so as to minimize exposure to high temperature.

EXAMPLE 1

A cylindrical pressure reactor with a closed, 1 mm X 1 mm, spinneret and a stirrer, and having a capacity of about 2,500 ml, is charged with a solution consisting of 380 g. acrylonitrile (AN), 27.2 g. methylacrylate (MA) which had been mixed beforehand and purged with nitrogen. A second solution of 3.0 g. sodium methallylsulfonate (SMS) in 800 g. water is purged with nitrogen and added to the reactor. The initiator, a nitrogen-purged solution of 1.12 grams Cobalt (III) acetylacetonate in 40 g. acrylonitrile, is added to a nitrogen-purged cylinder which is in valved communication with the reactor. The reactor and contents are heated to 135°C. with stirring and the initiator solution injected under 200 psig nitrogen pressure. Stirring is continued for 21 minutes at 132°–139°C. and shut down for 5 minutes, all the while maintaining the temperature at 136°C. The spinneret is opened, and a white, foamy fiber and plexifilaments are extruded alternately with steam. Polymer weighing 62.9 grams (14 percent conversion) is recovered having an inherent viscosity of 1.13. Nitrogen and sulfur analyses indicate a composition of 91 percent AN, 8% MA, and 1% SMS.

EXAMPLE 2

An agitated polymerization reactor having a total capacity of about 3,800 parts by weight of water is used in this preparation. It has a cylindrical upper section and a conical lower section. A metering gear pump is coupled to the bottom of the conical section. To prevent premature flashing of water during extrusion of the molten hydrate, the pump and connecting line are filled with polyethylene.

The reactor is charged, after it and the ingredients are nitrogen-flushed, with 716.4 parts by weight of acrylonitrile (AN), 93.2 parts vinyl acetate (VAc), 5.77 parts sodium methallylsulfonate (SMS), and 1504.5 parts water. The reactor is closed and heated to 135°C. under autogenous pressure, with stirring. A solution of 1.9 parts azo bis(cyclohexanecarbonitrile) (ABC) in 11.1 parts acetonitrile and 1.84 parts acetyl acetone (AcAc) is pumped in to initiate the polymerization, and stirring is continued for 25 minutes.

The following continuous feeds are initiated at the end of 25 minutes of polymerization:

|  | Parts |  |  |
|---|---|---|---|
| AN | 88.5 | at the rate | of 4.8 parts/min. |
| VAc | 11.5 | | |
| AcAc | 0.238 | | |
| SMS | 0.89 | parts/min. | (of a 0.38% aqueous solution) |
| ABC | 0.126 | parts/min. | (of a 12.7% solution in 85.8% acetonitrile and 14.2% AcAc as solvent) |

The metering pump is started, discharging the molten polymer hydrate into ambient conditions at a rate selected to approximate the feed rate. The early product is mixed, of course, with the polyethylene used to seal the system during start-up. The product polymer is found to have an inherent viscosity of 0.51 – 0.56.

EXAMPLE 3

AN(120 g.), $H_2O$(80 g.) and MA(5 g.) are added to a $N_2$-purged 1-liter rocker bomb (stainless steel), which is sealed and heated to 175°C. with rocking; 0.05 g. t-butyl peroxide in 20 g. AN is $N_2$ purged and injected into the bomb from a small stainless steel cylinder (kept below 100°C.) using $N_2$ pressure. The reaction is run for 2 minutes and the contents ejected through a thermally insulated tube extending from the bottom of the bomb to a pail of water on the outside. A total of 20.5g of polymer is obtained, representing a conversion of 14.1%. Nitrogen analysis (25.05%) indicates an MA content of 5.1%. Inherent viscosity is 0.70.

EXAMPLE 4

A. A reactor similar to that of Example 2, with a working capacity of about 6,700 ml. is used. Polymer hydrate, along with a small amount of entrained aqueous phase, is pumped to a horizontal, wiped-thin-film evaporator having 0.128 $ft^2$ of heat exchange area per pound-hour$^{-1}$ of polymer throughput in the preparation described below (0.259$m^2$/kg-hour$^{-1}$) and a length-to-diameter ratio in the wiped-film section of 3.36. The four-bladed wiper is sized to provide 0.040 inches (1.02mm) clearance to the heat-exchange surface at the leading edge, and each blade is equipped with a full-length skirt which extends over a 45° trailing arc at a clearance of 0.1 inch (2.54mm) to the heat-exchange surface. The wiped-film section and the discharge section are separately jacketed to permit controlling at different temperatures. The discharge leg is oriented vertically downward and is equipped with a compaction auger to minimize the probability of cavitation behind the gear pump attached thereto which meters melt to the spinneret.

After a start-up substantially according to the procedure of Example 2; the reagents and continuous feed rates as listed below are employed, resulting in a residence time of 90 minutes:

|  | ml/minute |  | % of Total Active Feeds |
|---|---|---|---|
| Acrylonitrile | 49.9 |  | 91.16 |
| Vinyl acetate | 2.52 |  | 5.32 |
| Methyl acrylate | 1.26 |  | 2.73 |
| Dicumyl peroxide initiator (.06769g in acetonitrile) | 1.76 |  | .15 |
| Water (containing 0.2854 g. SMS) | 18 | .67 | .65 |
| Total Feeds | 74.11 |  |  |

The reactor discharge pump is set to deliver approximately the feed quantity of reactor contents from the bottom of the conical reactor section to the evaporator. Analysis of a sample of the evaporator feed shows that 40.1% of the monomers has been converted to yield 17.73 g/min. of a polymer having a composition of 90.1% acrylonitrile units, 8.8% vinyl acetate and methyl acrylate units and 1.1% SMS units. The average inherent viscosity of the polymer produced is 0.99. The wiped-film section of the evaporator is maintained at 167°C. by circulation of oil through its jacket. The wiper is turned at 1,250 rpm. The vapor effluent from the evaporator is condensed and found by analysis to consist of high-quality monomers (vinyl acetate, methyl acrylate and acrylonitrile) and water. Such can usefully be recycled to the polymerization reactor with appropriate adjustment in quantity of feeds to result in a balanced system. Residence time in the evaporator is 65.7 seconds resulting in a melt of about 76 parts polymer to 24 parts water. The compaction auger in the discharge leg is rotated at 31.3 rpm to maintain a flooded inlet to a gear pump which meters polymer hydrate to a spinneret having 39 holes 0.18 X 0.18 mm in length X diameter. The spinneret is maintained at 170°C., and the pressure on the melt is 500 psig (35 kg/cm$^2$). Continuous acrylic filaments are thus produced which have frequent bubbly segments due to the excess (5 percent based on polymer) of water present. Filaments substantially free of bubbles can be produced by elimination of the excess water or by spinning of the composition of this example into a chamber maintained at moderate (40 psig; 60°C.) pressure and temperature and high humidity. Boiled-off fiber properties of such filaments are as follows: denier — 177, tenacity — 0.73 g/den., elongation at break — 4.1%, initial modulus — 31.8 g/den., and work-to-break — 0.021 g-cm/den.-cm.

B. In a preparation similar to that of Example 4A, the residence time of the hydrate melt in the evaporator is reduced to 53 seconds, leading to a composition which is approximately 70 parts polymer/30 parts water. This represents about 12 percent excess water, based on polymer. The melt is spun at a pressure of 10.5 kg./cm.$^2$ and a temperature of 175°C. to yield uniformly foamed filaments.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

I claim:

1. In the preparation of acrylonitrile polymer containing at least 40 weight percent acrylonitrile by aqueous phase polymerization of monomer for extrusion into fibers and films; an improved process suitable for use in a coupled polymerization and extrusion process, wherein the improvement comprises initiating the polymerization in a reaction medium consisting essentially of water, free radical polymerization initiator, acrylonitrile monomer and optional comonomer in a pressure reactor maintained at a temperature within the range of about 120° to about 215°C. under at least autogenous pressure, continuously feeding water, polymerization initiator and acrylonitrile monomer and optional comonomer to the reactor at rates selected to give an average reactor working-volume hold-up time of 10 to 90 minutes and which provide a monomer/water ratio within the range of about 0.25 to about 4, and about 0.01 to about 1.0 percent of initiator based on the weight of monomer present, continuously removing acrylonitrile polymer-hydrate melt from the bottom of the reactor, and then removing free-phase water and any unconverted, volatile monomer from the polymer-hydrate melt.

2. The process of claim 1, wherein the polymerizable monomer comprises at least 85 weight percent acrylonitrile.

3. The process of claim 2, wherein the polymerhydrate melt is extruded into a zone characterized by lower temperature and pressure than in the reactor to form fibers or films.

4. The process of claim 2 wherein, while still under at least autogenous pressure, the polymer-hydrate-melt removed from the reactor is separated from any entrained aqueous or volatile materials, from 0.5 to 10 percent, based on dry polymer content, of a compatible solvent for the polymer is added, and then the polymer-hydrate-melt is extruded into a zone characterized by lower temperature and pressure than in the reactor.

5. The process of claim 2 wherein, while still under at least autogenous pressure, the polymer-hydrate-melt removed from the reactor is mixed with controlled amount of water and then the polymer-hydrate-melt is extruded into a zone characterized by lower temperature and pressure than in the reactor.

* * * * *